United States Patent
Riedisser et al.

(10) Patent No.: US 10,747,523 B2
(45) Date of Patent: Aug. 18, 2020

(54) METHODS OF UPDATING FIRMWARE COMPONENTS, COMPUTER SYSTEMS AND MEMORY APPARATUS

(71) Applicant: FUJITSU LIMITED, Kawasaki-shi (JP)

(72) Inventors: Jochen Riedisser, Augsburg (DE); Gerold Scheidler, Bad Wünnenberg (DE)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/713,017

(22) Filed: May 15, 2015

(65) Prior Publication Data

US 2016/0306617 A1    Oct. 20, 2016

(30) Foreign Application Priority Data

Apr. 17, 2015   (DE) .................... 20 2015 101 904 U

(51) Int. Cl.
*G06F 9/44*        (2018.01)
*G06F 8/65*        (2018.01)

(52) U.S. Cl.
CPC ..................................... *G06F 8/65* (2013.01)

(58) Field of Classification Search
CPC .................................. G06F 8/65; G06F 8/665
See application file for complete search history.

(56) References Cited

U.S. PATENT DOCUMENTS 7,484,084 B1    1/2009   Ranaweera et al.
8,260,841 B1 *  9/2012   Maity .................. G06F 11/301
                                                    370/438

(Continued)

FOREIGN PATENT DOCUMENTS

JP    2001075786 A    3/2001
JP    2003173260 A    6/2003
(Continued)

OTHER PUBLICATIONS

USPTO, [Qamrun Nahar], Non-Final Rejection dated Mar. 24, 2016 in related U.S. Appl. No. 14/707,038.
(Continued)

*Primary Examiner* — Chat C Do
*Assistant Examiner* — Lenin Paulino
(74) *Attorney, Agent, or Firm* — Fujitsu Patent Center

(57) ABSTRACT

A method of updating firmware components of a computer system includes downloading at least one update packet by a service processor of the computer system, the service processor operating independently of a main processor and main operating system of the computer system; creating an image of a bootable virtual storage medium in a memory connected to the service processor by the service processor, the image including data from the at least one downloaded update packet and auxiliary operating system; incorporating the created image as virtual storage drive with the bootable first data storage medium; booting the computer system from the created image of the virtual storage medium, wherein the main processor starts the auxiliary operating system; and updating firmware components on the basis of data from the at least one update packet of the created image of the virtual data storage medium under the control of the auxiliary operating system.

20 Claims, 4 Drawing Sheets

(56) References Cited

U.S. PATENT DOCUMENTS

| | | | |
|---|---|---|---|
| 2002/0092008 A1* | 7/2002 | Kehne | G06F 8/65 717/168 |
| 2004/0093592 A1 | 5/2004 | Rao et al. | |
| 2004/0205779 A1* | 10/2004 | Almeida | G06F 8/65 719/321 |
| 2005/0278583 A1 | 12/2005 | Lennert et al. | |
| 2008/0077711 A1 | 3/2008 | Cepulis | |
| 2010/0250825 A1* | 9/2010 | Chen | G06F 16/10 711/6 |
| 2011/0047340 A1 | 2/2011 | Olson | |
| 2011/0154313 A1* | 6/2011 | Nolterieke | G06F 8/658 717/170 |
| 2011/0197055 A1* | 8/2011 | Spottswood | G06F 9/4401 713/2 |
| 2012/0198434 A1* | 8/2012 | Dirstine | G06F 8/65 717/170 |
| 2013/0007437 A1* | 1/2013 | Shroni | G06F 8/654 713/2 |
| 2013/0311763 A1* | 11/2013 | Saborowski | G06F 9/445 713/2 |
| 2014/0337004 A1 | 11/2014 | Maity et al. | |
| 2015/0149815 A1* | 5/2015 | Maity | G06F 11/1435 714/5.11 |
| 2015/0178096 A1* | 6/2015 | Inbaraj | G06F 9/4416 713/2 |
| 2015/0373038 A1 | 12/2015 | Blackwell | |

FOREIGN PATENT DOCUMENTS

| | | |
|---|---|---|
| JP | 2011070674 A | 4/2011 |
| JP | 2012053869 A | 3/2012 |
| JP | 2014093075 A | 5/2014 |
| JP | 2015060411 A | 3/2015 |

OTHER PUBLICATIONS

USPTO, [Qamrun Nahar], Final Rejection dated Sep. 29, 2016 in related U.S. Appl. No. 14/707,038.

USPTO, [Qamrun Nahar], Advisory Action dated Dec. 19, 2016 in related U.S. Appl. No. 14/707,038.

USPTO, [Nahar], Corrected Notice of Allowability dated Aug. 1, 2017 in related U.S. Appl. No. 14/707,038 [allowed].

USPTO, [Lo] Non-Final Rejection dated Oct. 6, 2017 in related U.S. Appl. No. 14/718,263 [pending].

USPTO, [Nahar], Notice of Allowance dated May 22, 2017 in related U.S. Appl. No. 14/707,038.

USPTO, [Alhija], Final Rejection dated Jul. 17, 2018 in related U.S. Appl. No. 14/718,263 [pending].

* cited by examiner

METHODS OF UPDATING FIRMWARE COMPONENTS, COMPUTER SYSTEMS AND MEMORY APPARATUS

TECHNICAL FIELD

This disclosure relates to methods of updating firmware components of computer systems in which at least one update packet is downloaded from at least one predetermined network source and is used to update firmware components of the computer systems. Furthermore, the disclosure relates to computer systems and memory apparatus having executable program codes stored thereon to perform such methods.

BACKGROUND

The term "firmware" denotes software components necessary to operate one or more hardware components, and that are normally independent of operating system. Firmware components are normally stored in a non-volatile memory of a hardware component itself or in a non-volatile memory of a system component. An example of a firmware component is the Basic Input Output System (BIOS) used to start a computer system.

Methods of updating firmware components of a computer system are widely known. The continually increasing complexity of computer systems and of the hardware components installed therein means that there is a great need for firmware components to be updated. Updating the firmware components closes security gaps that have recently become known or extends the functionality of the hardware components, for example.

Practically every manufacturer of hardware components provides ways to update the firmware components that it provides. By way of example, manufacturers of hardware components usually provide what are known as flash programs to update a programmable flash memory with a piece of updated firmware.

The multiplicity of firmware components that a computer system contains, on the one hand, and the increasing frequency of update thereof, on the other hand, mean that the outlay to maintain a computer system, particularly keeping the firmware components installed thereon running, is continually increasing. This is disruptive particularly in server computers, which are normally continuously in operation and therefore have only limited availability for maintenance work. In addition, manual installation of update packets by an administrator or user of a computer system gives rise to a large time involvement. In addition, the manufacturer needs to develop and maintain a plurality of different software tools to allow firmware components in different operating system environments to be updated.

It could therefore be helpful to provide methods and apparatus that simplify update of firmware components of computer systems. Preferably, they can reduce both the work involvement for an administrator and the system burden on the computer system itself and be largely independent of an operating system of the computer system.

SUMMARY

We provide a method of updating firmware components of a computer system including downloading at least one update packet by a service processor of the computer system, which service processor can be operated independently of a main processor and a main operating system of the computer system; creating an image of a bootable virtual storage medium in a memory connected to the service processor by the service processor, the image including data from the at least one downloaded update packet and an auxiliary operating system; incorporating the created image as a virtual storage drive with the bootable first data storage medium; booting the computer system from the created image of the virtual storage medium, wherein the main processor starts the auxiliary operating system; and updating firmware components on the basis of the data from the at least one update packet of the created image of the virtual data storage medium under the control of the auxiliary operating system.

We also provide a method of updating firmware components of a computer system including downloading at least one update packet by a service processor of the computer system, which service processor can be operated independently of a main processor and a main operating system of the computer system; compiling data from the at least one downloaded update packet and an auxiliary operating system to form a bootable first data storage medium by the service processor; booting the computer system from the compiled first data storage medium, wherein the main processor starts the auxiliary operating system; and updating firmware components on the basis of the data from the at least one update packet of the compiled first data storage medium under the control of the auxiliary operating system.

We further provide a computer system including a main processor that executes a main operating system; and a service processor that can be operated independently of the main processor and the main operating system, wherein the service processor loads at least one update packet for the computer system and compiles data from the at least one loaded update packet together with an auxiliary operating system to form a bootable first data storage medium, and wherein the main processor boots the computer system from the compiled first data storage medium using the auxiliary operating system and updates firmware components on the basis of the data from the at least one update packet of the compiled first data storage medium under the control of the auxiliary operating system.

We further yet provide a memory apparatus having executable program code stored thereon, wherein the execution of the program code by a service processor of a computer system involves steps being performed by the service processor: downloading at least one update packet independently of a main processor and a main operating system of the computer system; and compiling data from the at least one downloaded update packet and an auxiliary operating system to form a bootable first data storage medium.

LIST OF REFERENCE SYMBOLS

Figure 1:
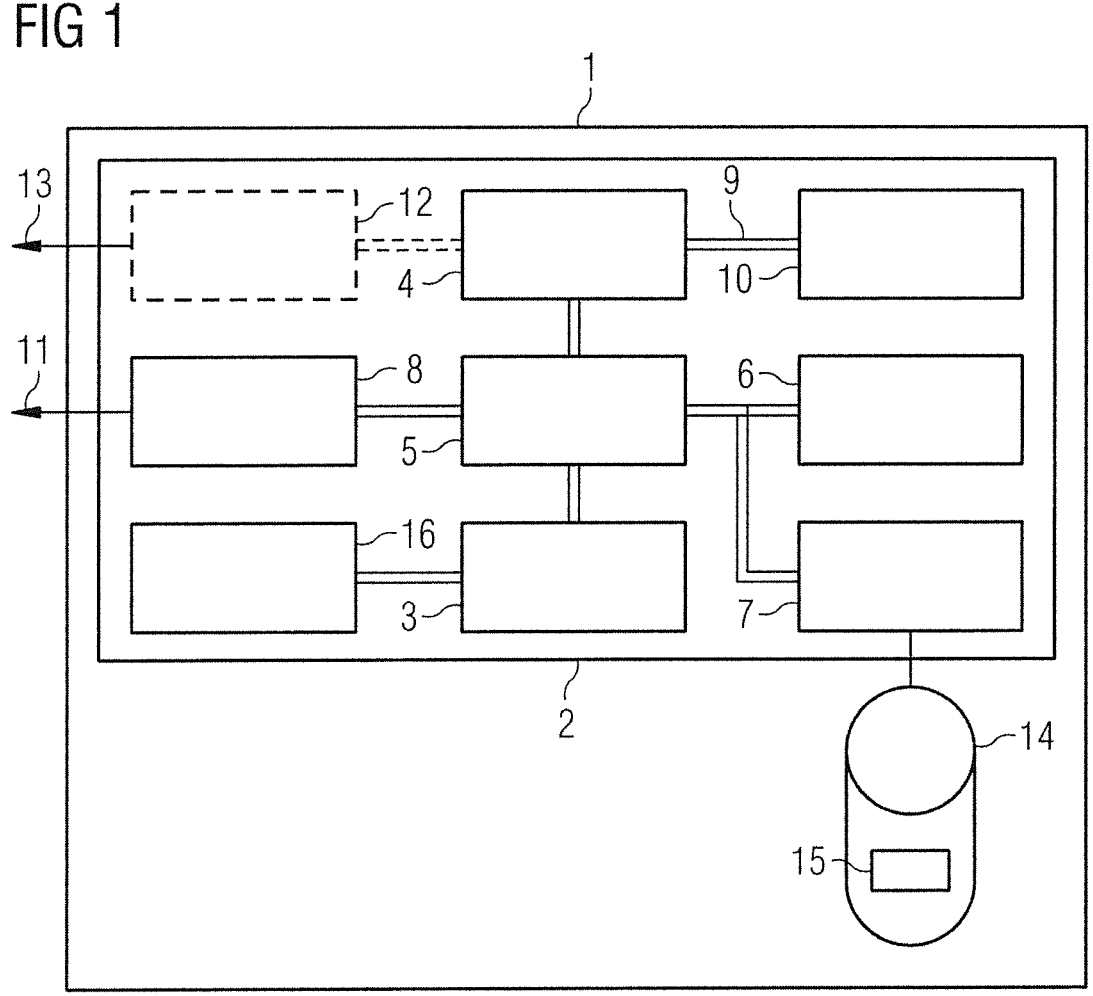
FIG. 1 shows a schematic illustration of an example of a computer system.

1 Computer system
2 System component

3 Main processor
4 Service processor
5 Chipset
6 Basic Input Output System (BIOS)
7 Input/output controller
8 (first) Network controller
9 Connection
10 Memory card
11 Data network
12 (second) Network controller
13 Management network
14 Bulk storage drive
15 (Main) operating system
16 Main memory
20 Application Framework Library
21 XML library
22 Database library
23 Virtual storage media library
24 IPMI library
25 Network interface
26 Communication interface
27 PCIe interface
29 System monitoring component
30 RAID manager
33 File system
34 Data volume (image of a first data storage medium)
35 Data volume (image of a second data storage medium)
36 Data volume (image of a bootable data storage medium)
37 Inventory list
38 Graphical user interface
40 Update packet
41 Update server
42 Firewall
43 Management station
44 Update service
45 Bootable data storage medium
46 Auxiliary operating system
47 Update program
48 Java archive
49 List of available updates
50 Data (for updating a firmware component)
51 Configuration file
52 Status information
53 USB interface

DETAILED DESCRIPTION

It will be appreciated that the following description is intended to refer to specific examples of structure selected for illustration in the drawings and is not intended to define or limit the disclosure, other than in the appended claims.

We provide a method of updating firmware components of a computer system. The method may comprise the following steps:
  downloading at least one update packet by a service processor of the computer system, which service processor can be operated independently of a main processor and a main operating system of the computer system;
  compiling data from the at least one downloaded update packet and an auxiliary operating system to form a bootable first data storage medium by the service processor;
  booting the computer system from the compiled first data storage medium, wherein the main processor starts the auxiliary operating system; and
  updating firmware components on the basis of the data from the at least one update packet of the compiled first data storage medium under the control of the auxiliary operating system.

The outlay to update the computer system may be split between a service processor and a main processor that can be operated independently of one another. In particular, the service processor accomplishes the often time-consuming download of one or more update packets and compiles a bootable first data storage medium from the data therefrom. During this time, a main operating system of the computer system can continue to run without disturbance, the download not resulting in an additional burden on the main processor. After the data from the update packet(s) and the auxiliary operating system have been compiled to form a bootable first data storage medium, the computer system is booted from the first data storage medium, with the main processor executing the auxiliary operating system of the bootable first data storage medium. Under the control of the auxiliary operating system, the firmware components can then be updated on the basis of the data from the at least one update packet independently of the main operating system installed on the computer system. In this way, updates can be performed independently of operating system and if required automatically.

The steps of download and/or compilation may be performed during operation of the main operating system.

The method may additionally comprise setting a boot drive of the computer system to the bootable first data storage medium, performance of a first restart for the computer system after the step of compilation has concluded, setting the boot drive of the computer system to a bootable second data storage medium that stores the main operating system, and performing a second restart for the computer system when the step of update of firmware components has concluded. The aforementioned steps allow performance of a change between a normal mode of operation under the control of the main operating system and an update mode of operation under the control of the auxiliary operating system.

The first restart may be initiated by a message from the service processor to the main operating system or the main processor. This allows, in particular, automatic or remote-controlled update of the firmware components.

By way of example, compilation of the bootable first data storage medium comprises creation of an image of a virtual storage medium in a memory connected to the service processor and incorporation of the created image as a virtual storage drive with the bootable first data storage medium. The cited mechanism allows the downloaded update packet to be incorporated into the computer system particularly flexibly and in compliance with the standard.

The step of download and compilation can involve, by way of example, the type of the computer system being taken as a basis of acquiring update packets for all possible components of the computer system. In this case, the step of update involves an update program updating only such firmware components as are existent in the computer system and/or as are not up to date. Such an approach makes it possible to dispense with a prior check on hardware components actually installed in a computer system by the service processor.

The step of download and/or update may be initiated by a scheduling component of the service processor. This allows a regular update of firmware components.

The steps of download, compilation and update may each involve data from a plurality of update packets being processed. Joint processing of a plurality of updates reduces the associated interruptions in operation of the computer system.

We also provide computer systems. The computer systems may comprise a main processor to execute a main operating system and a service processor that can be operated independently of the main processor and the main operating system. The service processor is set up to load at least one update packet for the computer system and compile the data thereof together with an auxiliary operating system to form a bootable first data storage medium. The main processor is set up to boot the computer system from the compiled first data storage medium using the auxiliary operating system and to update firmware components on the basis of the data from the at least one update packet of the compiled first data storage medium under the control of the auxiliary operating system.

The computer systems essentially allow performance of the methods.

The computer systems may comprise at least one first memory apparatus that stores the main operating system, and at least one second memory apparatus which can be operated independently of the first memory apparatus and is coupled to the service processor, to store the bootable first data storage medium. The provision of separate memory apparatuses to store the main operating system, on the one hand, and the bootable first data storage medium, on the other hand, makes it possible to avoid impairing the memory space available for the main operating system while the update packets are downloaded by the service processor.

The service processor may be set up to store an image of a virtual storage medium in the second memory apparatus and incorporate the stored image into the computer system as a bootable first data storage medium. By way of example, the stored image can be incorporated into the computer system in a read-only mode of operation, particularly as a storage medium for a virtual CD or DVD drive. Such incorporation allows simple, standard-compliant incorporation of extensive data into the computer system. Particularly when a read-only mode of operation is used, effective protection against alteration of the data stored in the second memory apparatus by a process running outside the service processor is also ensured.

By way of example, the second memory apparatus may be a non-volatile bulk storage device, particularly a flash memory chip permanently connected to the computer system or an interchangeable flash memory card. Such storage media allow the inexpensive and permanent storage of extensive data.

The service processor may be set up to emulate a standard interface to access the bootable first data storage medium so that the auxiliary operating system can access the first data storage medium without a piece of manufacturer-specific driver software. This has the advantage that the method can be used with a multiplicity of different auxiliary operating systems on a multiplicity of different system architectures.

We further provide memory apparatus having executable program code stored thereon. Execution of the program code by a service processor of a computer system involves the service processor downloading at least one update packet independently of a main processor and a main operating system of the computer system and compiling data from the at least one downloaded update packet and an auxiliary operating system to form a bootable first data storage medium.

The executable program code of the memory apparatus may be used particularly to program a service processor that performs our method or setting up our computer systems.

Further advantageous are disclosed in the appended claims and the description of examples that follows.

FIG. 1 shows a computer system 1 according to an example. In particular, the computer system 1 shown in FIG. 1 is what is known as a server computer, as used in computer centers, for example. The computer system 1 comprises a system component 2 having a plurality of components installed thereon. By way of example, the system component 2 is a motherboard of the computer system 1.

The system component 2 has a main processor 3 and a service processor 4 arranged on it in the example. By way of example, the main processor 3 is a powerful microprocessor from the company Intel, for example, an Intel® Xeon® processor. By way of example, the service processor 4 is what is known as an intelligent remote management controller (iRMC). Such service processors are sometimes also known by the term "baseboard management controller" (BMC) or the term "system management chip" (SMC). The service processor 4 is used inter alia to monitor the correct operation of the computer system 1 and to perform remote maintenance tasks independently of the main processor 3. By way of example, the computer system 1 can be switched on or off using the service processor 4 via a management network.

The main processor 3 and the service processor 4 connect to further components of the computer system 1 via one or more bus systems or coupling elements. In the example, a chipset 5 is used to connect the main processor 3 and the service processor 4 to a memory chip for a Basic Input Output System, BIOS, 6, to an input/output controller 7 and to a network controller 8.

Furthermore, the service processor 4 in the example connects to a memory card 10 via a dedicated connection 9. In the example, this is what is known as a microSD flash memory card based on industrial standard SDHC from the SD Card Association (http://www.sdcard.org). Alternatively, it is also possible to use what is known as an eMMC card or another non-volatile storage medium such as a flash memory permanently connected to the system component 2. The memory card 10 is used for the non-volatile storage of extensive data from the service processor 4, for example, amounting to 16 GB.

The network controller 8 of the computer system 1 connects to a data network 11, for example, a local Ethernet company network. Furthermore, the service processor 4 connects either to a separate management network 13 via a further, optional network controller 12 or to the same data network 11 via the chipset 5 and the network controller 8. The management network 13 may also be a virtual network based on the same physical network as the data network 11.

The computer system 1 furthermore comprises a bulk storage drive 14 connected to the input/output controller 7. In the example, the bulk storage drive 14 stores particularly an operating system 15 for the computer system 1. By way of example, the operating system 15 is the operating system Microsoft® Windows® Server 2012, which runs practical applications for the computer system 1. Accordingly, the operating system 15 is subsequently also referred to as a host or main operating system.

Finally, the computer system 1 comprises a main memory 16 into which program code and associated data are loaded for execution by the main processor 3. Further components of the computer system 1 such as a power supply are not shown in FIG. 1 for reasons of clarity.

As an aid to understanding, essential components of the hardware and software architecture of the service processor 4 are described below with reference to FIG. 2.

The service processor 4 is used to maintain the computer system 1 during different phases, for example, when it is first set up and updated. A central component of the firmware thereof is what is known as an Application Framework Library 20, which uses a service operating system—not shown in FIG. 2—to provide various runtime services for software components running on the service processor 4. In the example, the service processor 4 runs a distribution—customized for embedded systems—of the free operating system Linux, which runs independently of the main operating system 15 of the main processor 3. The Application Framework Library 20 can be used by individual software modules for central access to different resources of the service processor 4. To this end, there are a plurality of libraries 21 to 24 available. Inter alia, the Application Framework Library 20 allows access to an XML library 21, a database library 22, a virtual storage media library 23 and an IPMI library 24 for system management. The IPMI library 24 can be used to read or alter settings of the BIOS 6, for example.

The Application Framework Library 20 furthermore allows access to the management network 13 via a network interface 25. The access via the network interface 25 can take place using the known http or ftp protocols, for example. The network interface 25 is used to download extensive data from an update server, for example, as described later. Furthermore, the Application Framework Library 20 provides a communication interface 26 between the service processor 4 and the main processor 3, or software components running thereon, via a PCIe interface 27. By way of example, the communication interface 26 may be what is known as the ServerView Common Command Interface (SCCI), via which manufacturer-specific commands for platform management are interchanged. The physical PCIe interface 27 can be used in particular to interchange extensive data between the service processor 4 and the memory card 10 connected thereto and programs running on the main processor 3. Furthermore, the service processor 4 emulates, for the BIOS 6, a boot apparatus connected by a USB connection and that can be used, inter alia, to start the computer system 1 from the memory card 10. Both the communication interface 26 and the USB connection are implemented as logical, "memory-mapped IO" interfaces. Physically, the data required for them are interchanged via the PCIe interface 27 in this case.

Figure 2:
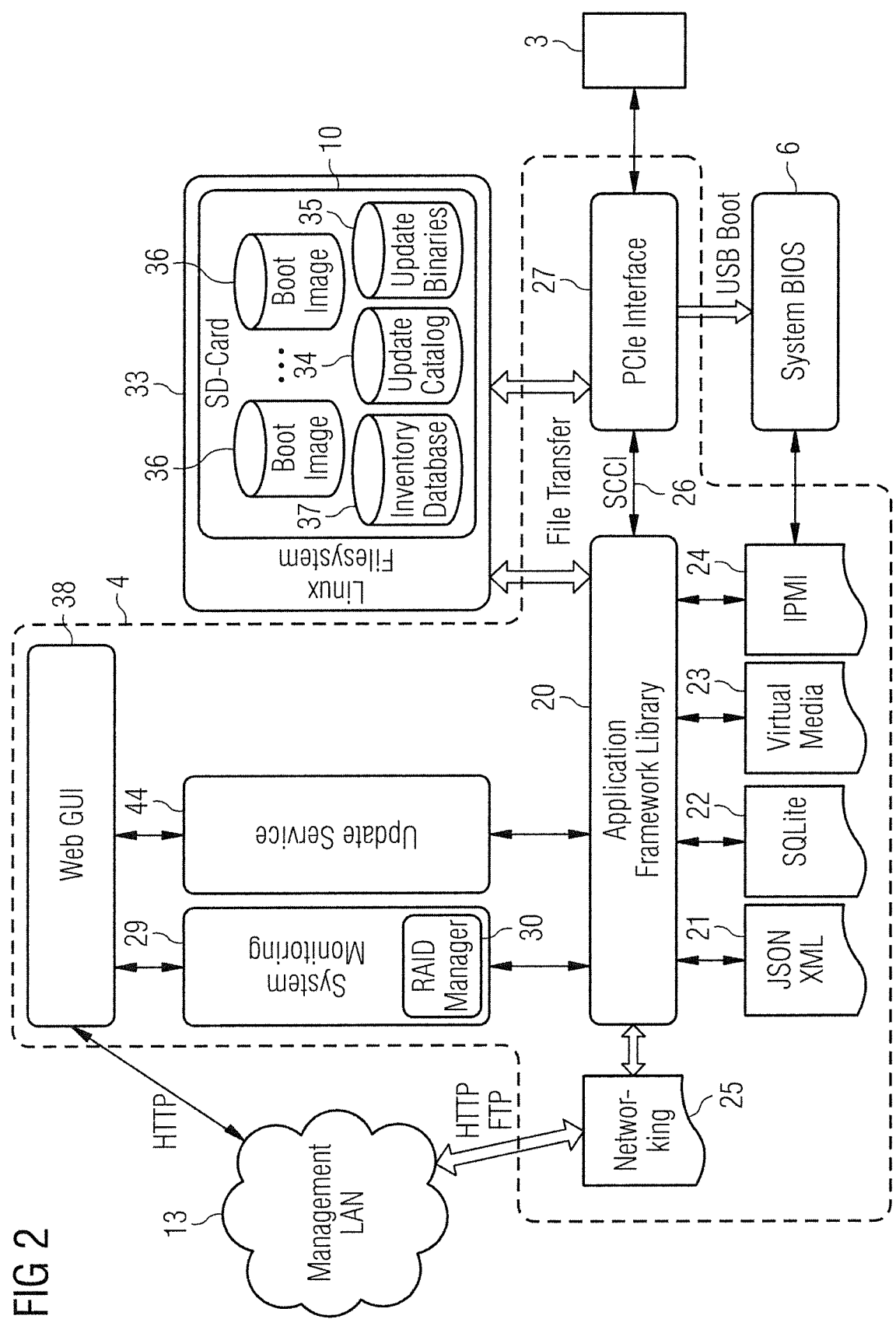
FIG. 2 shows a schematic illustration of components of a service processor.

In the example shown in FIG. 2, different software components of the service processor 4 access the Application Framework Library 20. A first component 29 is used particularly to perform system monitoring. It comprises, inter alia, a RAID manager 30 to manage and monitor storage media. A second component in the form of an update service 44 is responsible for providing and compiling update packets (updates). The update service 44 is described in detail later with reference to FIGS. 3 and 4.

The components 29, 30 and 44 and also other software components of the service processor 4 can access a file system 33 of the memory card 10 via the Application Framework Library 20. The memory card 10 stores different data volumes 34, 35 and 36 in the example. In this context, a data volume is understood to mean data or files stored in a logically coherent fashion. By way of example, it is a data storage medium volume of the memory card 10, a file with an image of a virtual data storage medium or an archive with related files. The data volumes 34 and 35 are images of a first virtual data storage medium with an update catalogue or of a second virtual data storage medium with update packets stored therein. The data volume 36 is images of different bootable, virtual data storage media such as the images of bootable CDs or DVDs. Furthermore, the memory card 10 also stores an inventory list 37 or database with inventory information from the computer system 1. The inventory list 37 contains information pertaining to each component installed in the computer system 1 and additionally information pertaining to the installed software or firmware of these components.

The software components 29 and 44 are managed by a system administrator using a web-based graphical user interface 38. To this end, the system administrator can access the user interface 38 via the management network 13, for example.

Figure 3:
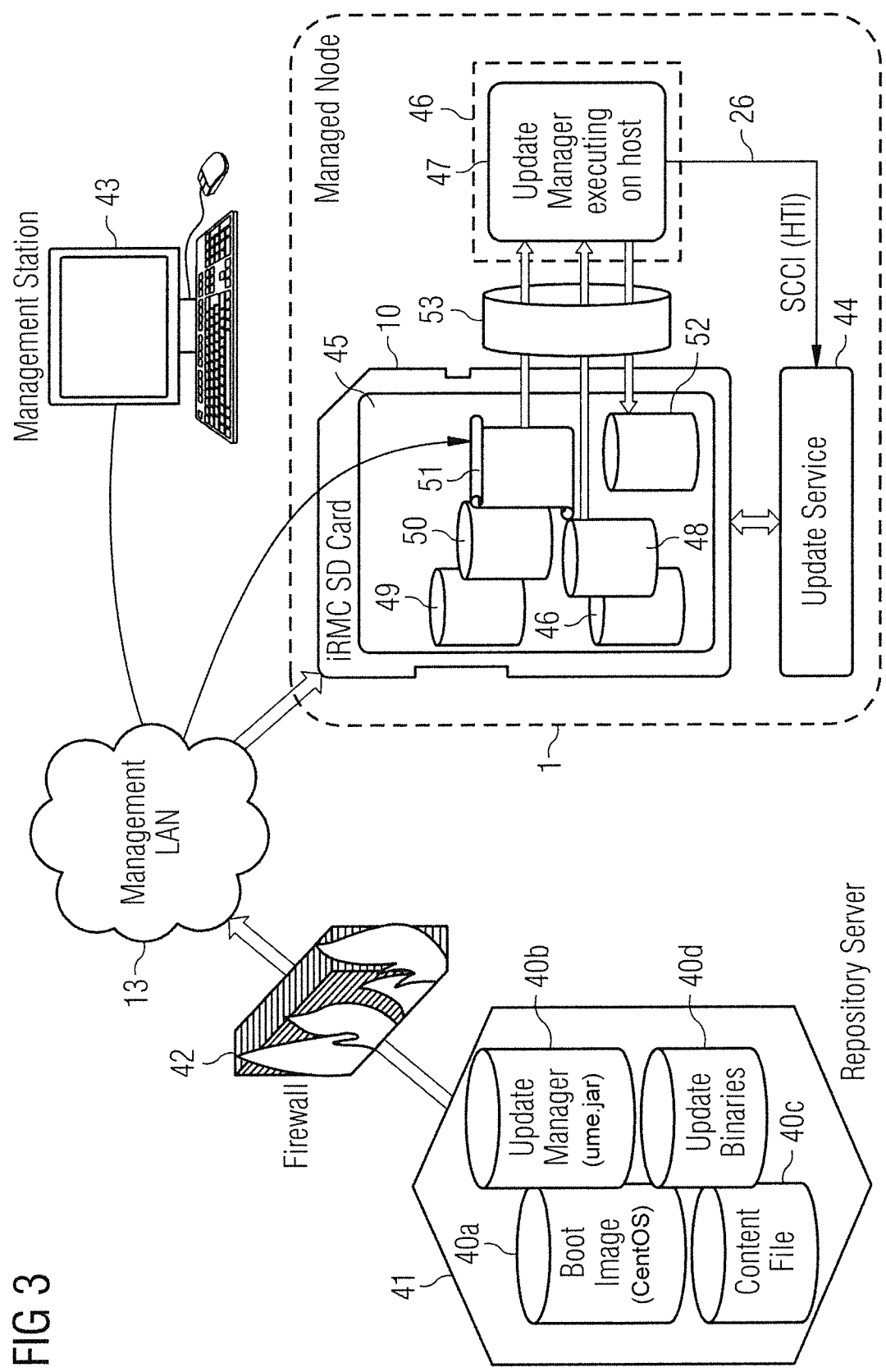
FIG. 3 shows a schematic illustration of the interaction between a managed computer system, a repository server and a management station.
Figure 4:
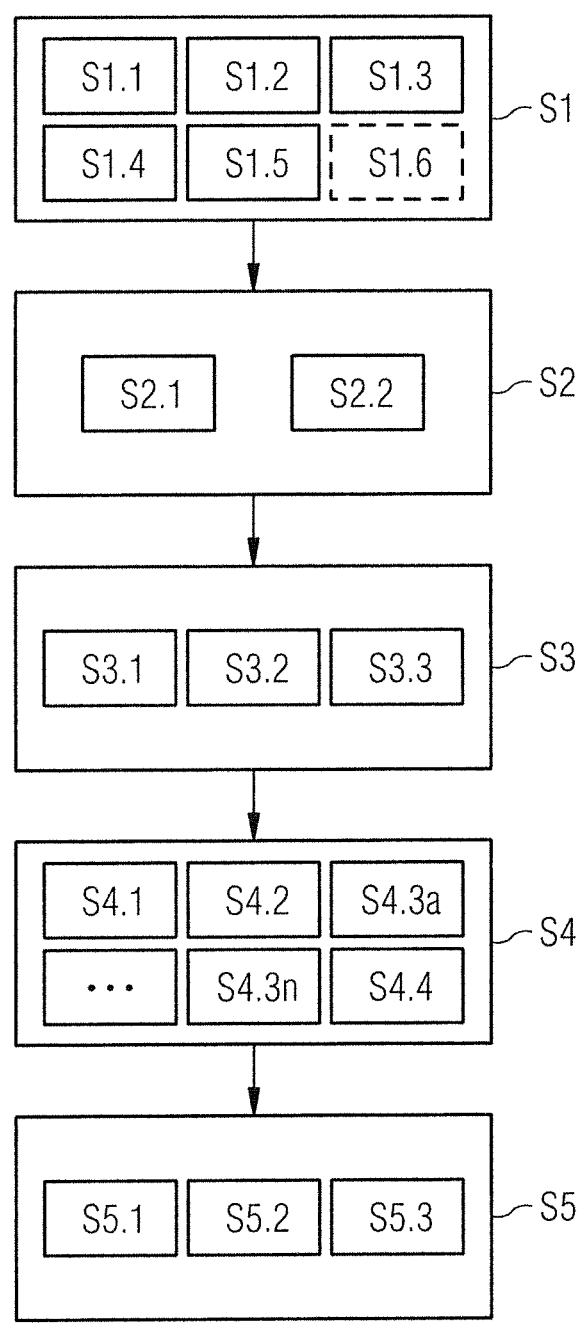
FIG. 4 shows a flowchart for a method of updating firmware components.

With reference to FIGS. 3 and 4, the text below describes a method of updating firmware components of the computer system 1. In this case, FIG. 3 shows the interaction between the computer system 1, an update server 41 and a management station 43. FIG. 4 shows the steps of the method.

The computer system 1, the update server 41 and the management station 43 connect to one another via the management network 13 in the example shown. Typically, the server computer 1, the management station 43 and the management network 13 are situated in the region of a computer center or individual company. In the example, the update server 41 is situated outside the company network and isolated therefrom by what is known as a firewall 42. By way of example, the update server 41 is situated with a manufacturer of the computer system 1. The update server 41 is used by the manufacturer to provide update packets 40 via the internet.

The management station 43 is essentially used for access by an administrator of the company network to the graphical user interface 38 of the service processor 4. The management station 43 can be used to manually initiate an update for the server computer 1. Alternatively, it is also possible for the management station 43 to be used to configure a regular schedule to a scheduling component of the service processor 4 so that the computer system 1 performs an update for firmware components regularly at predetermined times. Furthermore, the management station 43 can also be used to set the address of an update server 41 that needs to be used for this purpose. By way of example, besides the update server 41 shown in FIG. 3, it is also possible to specify a URL for an update server arranged in the local management network 13. Instead of manual operator control using the graphical user interface 38, it is also possible to send a configuration script with appropriate settings to a web service provided by the service processor 4 via the network component 25.

The text below describes a method of updating firmware components of the computer system 1 that operates independently of the main operating system 15 of the computer system 1. Due to the lack of dependence on the main operating system 15, the method is referred to as "offline update."

To achieve a lack of dependence on the main operating system 15 of the computer system 1 and additionally to ensure efficient performance of the method, the update service 44 compiles a bootable data storage medium 45 that contains all the information required for updating firmware components. In the example, the programs and data required for this purpose are retrieved for the update server 41 by the update service 44 in the form of update packets 40 under the control of the service processor 4. In the example, the update packets 40 are each executable program code from self-extracting archives, the content of which is unpacked by the update service 44 on the memory card 10. On the basis of these data, a binary file is created in the data format of a virtual CD-ROM or DVD-ROM in the example described. This is an image—stored on the memory card 10—of a bootable data storage medium such as one of the data volumes 36. In particular, it may be an ISO 9660-compliant image of a CD or DVD.

The bootable data storage medium 45 comprises, inter alia, executable program code for an auxiliary operating system 46 for the main processor 3 of the computer system 1. The auxiliary operating system 46 is provided by the update server 41 via a first update packet 40a and is used primarily to update firmware components of the computer system 1. In the example, the auxiliary operating system 46 is a customized version of the Linux distribution CentOS (http://www.centos.org).

The bootable data storage medium 45 furthermore comprises program code to execute an update program 47, what is known as the Update Manager Express, that can be executed under the control of the auxiliary operating system 46. In the example, the program code is provided in the form of an executable Java archive 48 via a second update packet 40b. Since the update program 47 must be executable just under the auxiliary operating system 46, which is likewise provided via the update server 41, the manufacturer of the computer system 1 is released from complex development and maintenance of different versions of the update program 47 for different host operating systems. The update program 47 itself can be updated on the basis of associated version information by the update service 44 of the service processor 4 by downloading an updated update packet 40b.

In different examples, selection of the firmware components to be updated is undertaken either by the update service 44 of the service processor 4 or by the update program 47 executed under the control of an auxiliary operating system 46. If the selection is already made by the update service 44, for example, on the basis of the inventory list 37, it is necessary to download only such firmware updates in the form of update packets 40d as are actually required to update the server computer 1. If the identification is first made by the update program 47, initially all of the update packets 40d possibly relevant to the computer system 1 are downloaded from the update server 41 and stored on the data storage medium 45. Only later are the updates that actually need to be used selected during execution of the update program 47 while the auxiliary operating system 46 is running.

In the example, a consistency check is performed between already existent firmware components and available updates not until the runtime of the update program 47, that is to say after the bootable data storage medium 45 has been compiled. Accordingly, the update service 44 of the service processor 4 loads a list 49 of available update packets 40d provided via a third update packet 40c. The list 49 contains information pertaining to all firmware updates probably required for a given computer model. The list 49 is likewise stored on the memory card 10.

During operation, the update program 47 requires local access to data 50 from the updates that are to be installed. Accordingly, the update service 44 first of all downloads all of the new or updated update packets 40d according to the list 49 and stores them on the memory card 10. In the example, the downloaded update packets 40d are unpacked and the data 50 contained therein are stored on the bootable data storage medium.

Optionally, the bootable data storage medium may also contain further information evaluated or accrues during the performance of the update. By way of example, the bootable data storage medium 45 can contain a configuration file 51 with information pertaining to the components to be updated and also status information 52 pertaining to the current update status.

In the example described, the programs and data required to update firmware components, particularly the auxiliary operating system 46, the update program 47, the list 49 of available update packets and the data 50 from the new or updated firmware components or firmware patches, may be downloaded in the form of update packets 40 from predetermined branches of a directory hierarchy of the update server 41. Specifically, the first update packet 40a with the auxiliary operating system 46 and the second update packet 40b with the update program 47 may be kept available at a predetermined location in the directory tree of the update server 41, for example, in a "tools" directory. By way of example, the further update packets may be situated in a directory of the update server 41 specific to the computer system 1. In other examples, individual components such as the auxiliary operating system 46 or the update program 47, may also be stored in a memory of the service processor 4 already, for example, on the memory card 10, and can be updated only when required. Furthermore, it is also possible for the various data, programs and/or update packets 40 to be retrieved from different sources, for example, from update servers of different manufacturers.

To make the bootable data storage medium 45 available for the BIOS 6 and an operating system 15 or 46 started by the latter, the service processor 4 emulates a virtual DVD drive connected to the computer system 1 via a likewise emulated USB interface 53. Using the virtual DVD drive, the update program 47 can access the data stored in the bootable data storage medium 45, as it can access a physical DVD drive that has a bootable data storage medium 45 inserted in it and connected via a USB interface. Accordingly, the main processor 4 and an operating system running thereon such as, in particular, the main operating system 15 or the auxiliary operating system 46, require no installation of a proprietary driver.

FIG. 4 shows the steps of an exemplary method to offline update firmware components such as the BIOS 6 or the firmware of the network controller 8 or 12 of the computer system 1.

In a first step S1, the service processor 4 compiles the bootable data storage medium 45 with the auxiliary operating system 46, the update program 47 and the data 50 from the firmware components to be updated. The programs and data required for this purpose are loaded in the form of update packets 40 via the management network 13 and stored on the memory card 10. Use of the service processor 4 avoids negatively influencing the main processor 3 and the main operating system 15 running thereon. Use of the management network 13 avoids negatively influencing the data network 11. Use of the memory card 10 as storage destination additionally avoids negatively influencing the bulk storage drive 14.

In the specific example, the data storage medium 45 is created in five or six substeps. In a first substep S1.1, the update packet 40c is downloaded. In a second substep S1.2, the list 49 of available updates that the update packet 40c contains is unpacked on the memory card 10. In a third substep S1.3, the list 49 has the information that it contains checked against version information to select the current update packets for download. In a fourth substep S1.4, the selected update packets 40*a*, 40*b* and 40*d* are downloaded and stored on the memory card 10. In a fifth substep S1.5, the downloaded update packets 40*a*, 40*b* and 40*d* are unpacked and the program code that they contain for the auxiliary operating system 46 and for the update program 47 and the data 50 are stored in a corresponding temporary directory structure of the memory card 10. In an optional sixth substep S1.6, the service processor 4 creates the configuration file 51 with global settings for the update program 47 and/or specific settings for individual updates such as restarts between individual update steps in a multistage update.

The download is effected via a connection—encrypted by SSL—between the service processor 4 and the update server 41. It is additionally or alternatively also possible for other security methods such as the use of certificates, asymmetric encryption methods and so on, to be used. In systems without security relevance, it is also possible to dispense with security entirely.

In a second step S2, the bootable data storage medium 45 is provided as a data storage medium inserted into the virtual DVD drive. To this end, in a first substep S2.1, the data from the temporary directory structure are taken as a basis for creating an image file for the bootable data storage medium 45. In a second substep S2.2, the image file created is incorporated into the file system 33 of the service processor 4 and provided as a medium of the virtual DVD drive via the library 23.

Subsequently, the service processor 4 initiates a restart for the computer system 1 in step S3. For this purpose, the BIOS 6 is configured, in a first substep S3.1, to boot from the bootable data storage medium 45 after a restart. In a second substep S3.2, an ACPI request from the service processor 4 to the main operating system 15 is used to initiate a restart of the computer system 1 under the control of the main operating system 15, for example. The restart can be deferred if need be to a time favorable therefor by the main operating system 15. In this way, it is possible to avoid uncontrolled interruption of the operation of the services provided by the computer system 1. In a subsequent substep S3.3, the main processor 3 therefore loads the auxiliary operating system 46 from the bootable data storage medium 45 and boots the computer system 1 under the control thereof.

The auxiliary operating system 46 is configured to immediately follow its starting by calling the update program 47 to update firmware components in a step S4. In the example described, the update program 47 first selects the updates to be performed. It does so by creating, in a first substep S4.1, a list of updatable firmware components and associated version information existent in the computer system 1. In a second substep S4.2, the version information captured from the existent firmware components is compared to version information from the list 49 of available updates. Only such firmware components as are actually existent in the computer system and for which a more up-to-date version of the firmware component is available are selected for the subsequent update.

Optionally, in substep S4.2, updates that require a joint update of a firmware component and of an associated, operating-system-specific driver can be removed from the selection. For reasons of dependability for the main operating system 15, such components should preferably be performed using the aforementioned "online update." Alternatively, it is also possible to retrieve from the inventory list 37 information about a driver version of the corresponding component that is currently used by the main operating system 15. If a driver compatible with the firmware component to be installed is already installed, the corresponding update can be performed by the update program 47 without risk.

The components selected in substep S4.2 are updated by the update program 47 in subsequent steps S4.3*a* to S4.3*n*. In this case, particularly what are known as flash memories, which store the firmware for individual hardware components of the computer system 1, are updated by the update program 47. By way of example, the update is effected on the basis of the data 50 from the update packets 40*d* by overwriting the previously stored firmware component with a new firmware component or by patching an already stored firmware component using appropriate firmware patches.

Particularly when patching an existent firmware component, it may be necessary to perform a multistage update. In this case, one update packet 40*d* is downloaded by the service processor 4 per update step and the data 50 in the update packet are processed by the update program 47. If it is necessary for the computer system 1 to be restarted between the individual substeps, the update program 47 requests this as described below.

Once all of the updates of substeps S4.3*a* to S4.3*n* have been concluded, the update program 47 updates the database 52 in a substep S4.4. Alternatively, the substep S4.4 can also be effected immediately after the updates for individual firmware components and/or after individual update steps S4.3.

Subsequently, the computer system 1 is restarted again in step S5. Once all the updates have been performed, the update program 47 or the service processor 4 reconfigures the BIOS 6 in a substep S5.1 such that the subsequent restart is effected by the bulk storage drive 14 with the main operating system 15 stored thereon. In a further substep S5.2, the update program 47 sends a manufacturer-specific SCCI command to the service processor 4 via the communication interface 26 in the example to initiate a cold or warm start for the computer system 1. Accordingly, the computer system 1 boots the main operating system 15 in a substep S5.3 and is thus again available to execute practical applications, particularly server services provided by a server computer.

The invention claimed is:

1. A method of updating firmware components of a computer system with a motherboard, the motherboard of the computer system comprising a main processor, a first memory chip for storing a Basic Input Output System (BIOS) for the computer system, a service processor and a second memory chip connected to the service processor via a dedicated connection, wherein the BIOS is used for starting a main operating system of the computer system, the service processor can be operated independently of the main processor and the main operating system of the computer system, and wherein the second memory chip is a flash memory permanently connected via the dedicated connection to the service processor of the computer system or an interchangeable flash memory card connected via the dedicated connection to the service processor of the computer system and is used for non-volatile storage of data of the service processor, the method comprising:

downloading a plurality of update packets by the service processor of the computer system from an update server and storing the plurality of update packets in the second memory chip;

creating an image of a bootable virtual storage medium in the second memory chip by the service processor, the image comprising data from the plurality of downloaded update packets, program code for executing an update program and an auxiliary operating system, wherein the update program is executed under the control of the auxiliary operating system for updating firmware components of the computer system, the service processor emulates a standard interface to access the bootable virtual storage medium so that the auxiliary operating system can access the bootable virtual storage medium without specific software drivers;

incorporating the created image as a virtual storage drive with the bootable virtual storage medium and making the bootable virtual data storage medium available for the BIOS;

booting, by means of the BIOS, the computer system from the created image of the bootable virtual storage medium, wherein the BIOS running on the main processor starts the auxiliary operating system; and updating, by the update program, the firmware components on the basis of the data from the plurality of update packets of the created image of the bootable virtual data storage medium under the control of the auxiliary operating system.

2. The method according to claim 1, wherein the downloading and the creating are performed during operation of the main operating system.

3. A method of updating firmware components of a computer system with a motherboard, the motherboard of the computer system comprising a main processor, a first memory chip for storing a Basic Input Output System (BIOS) for the computer system, a service processor and a second memory chip connected to the service processor via a dedicated connection, wherein the service processor can be operated independently of the main processor and a main operating system of the computer system, the BIOS is used for starting either the main operating system stored on a bulk storage drive of the computer system or an auxiliary operating system for the main processor of the computer system stored on a flash memory connected to the service processor, and wherein the second memory chip is a flash memory permanently connected via the dedicated connection to the service processor of the computer system or an interchangeable flash memory card connected via the dedicated connection to the service processor of the computer system and is used for non-volatile storage of data of the service processor, the method comprising:

downloading at least one update packet by the service processor of the computer system from an update server and storing the at least one update packet in the second memory chip;

compiling data from the at least one downloaded update packet stored in the second memory chip and an auxiliary operating system to form a bootable first data storage medium by the service processor, the bootable first data storage medium comprising data from the one update packet, program code for executing an update program and the auxiliary operating system, wherein the update program can be executed under the control of the auxiliary operating system for updating firmware components of the computer system, the service processor emulates a standard interface to access the bootable first data storage medium so that the auxiliary operating system can access the bootable first data storage medium without specific software drivers;

booting the computer system from the compiled bootable first data storage medium wherein the BIOS running on the main processor starts the auxiliary operating system; and updating the firmware components on the basis of the data from the at least one update packet of the compiled first data storage medium under the control of the auxiliary operating system.

4. The method according to claim 3, further comprising:

setting a boot drive of the computer system to the bootable first data storage medium;

performing a first restart for the computer system after compilation has concluded;

setting the boot drive of the computer system to a bootable second data storage medium that stores the main operating system; and performing a second restart for the computer system when the step of update of firmware components has concluded.

5. The method according to claim 4, wherein the first restart is initiated by a message from the service processor to the main operating system or the main processor.

6. The method according to claim 3, wherein;

the downloading and the compiling involves the computer system being taken as a basis to acquire update packets for all possible components of the computer system; and the updating involves an update program updating only such firmware components as are existent in the computer system and/or as are not up to date.

7. The method according to claim 3, wherein the downloading involves a list of available updates being downloaded and the service processor taking an evaluation of the list as a basis for subsequently downloading further update packets.

8. The method according to claim 3, wherein the downloading, the compiling and the updated each involve the data from a plurality of update packets being processed.

9. A computer system comprising:

a system component;

a bulk storage device storing a main operating system;

a main processor arranged on the system component configured for executing the main operating system;

a service processor arranged on the system component that can be operated independently of the main processor and the main operating system;

a flash memory device arranged on the system component and connected to the service processor via a dedicated connection, the flash memory device being configured for non-volatile storage of data of the service processor; and a memory chip for storing a Basic Input Output System (BIOS) for the computer system, for booting the computer system using either the main operating system or an auxiliary operating system stored on the flash memory device;

wherein the service processor downloads at least one update packet for the computer system from an update server, stores the at least one downloaded update packet in the flash memory device and compiles data from the at least one downloaded update packet stored in the flash memory device together with the auxiliary operating system to form a bootable first data storage medium, the bootable first data storage medium comprising data from the one update packet, program code for executing an update program and the auxiliary operating system, wherein the update program can be executed under the control of the auxiliary operating system for updating firmware components of the computer system, the service processor emulates a standard interface to access the bootable first data storage medium so that the auxiliary operating system can access the bootable first data storage medium without specific software drivers; and wherein the BIOS running on the main processor boots the computer system from the compiled first data storage medium using the auxiliary operating system and updates firmware components on the basis of the data from the at least one update packet of the compiled first data storage medium under the control of the auxiliary operating system.

10. The computer system according to claim 9, wherein the service processor stores an image of a virtual storage medium in the flash memory device and incorporates the stored image into the computer system as a bootable first data storage medium.

11. The computer system according to claim 10, wherein the service processor incorporates the stored image into the computer system in a read-only mode of operation, particularly as a storage medium for a virtual CD or DVD drive.

12. The computer system according to claim 9, further comprising:
a first firmware component that starts the computer system from a selectable memory apparatus, wherein the service processor furthermore selects the flash memory device to start the computer system after compilation of the bootable first data storage medium and select the bulk storage device to start the computer system after update of the firmware components.

13. The computer system according to claim 9, wherein the service processor comprises a scheduling component that loads the at least one update packet for the computer system according to a first predetermined schedule.

14. A memory apparatus having executable program code stored thereon, wherein the execution of the program code by a service processor arranged on a motherboard of a computer system involves steps being performed by the service processor:
downloading at least one update packet from an update server into a flash memory device connected to the service processor and arranged on the motherboard of the computer system, wherein the flash memory device and the service processor are connected via a dedicated connection and the step of downloading is performed independently of a main processor arranged on the motherboard of the computer system and independently of a main operating system of the computer system executed by the main processor; and
compiling data from the at least one downloaded update packet and an auxiliary operating system to form a bootable first data storage medium in the flash memory device, the bootable first data storage medium comprising data from the one update packet, program code for executing an update program and the auxiliary operating system, wherein the update program can be executed under the control of the auxiliary operating system for updating firmware components of the computer system,
wherein the service processor emulates a standard interface to access the bootable first data storage medium so that the auxiliary operating system can access the bootable first data storage medium without specific software drivers, and
wherein the auxiliary operating system on the bootable first data storage medium is configured to be started by a Basic Input Operating System (BIOS) for the computer system running on a main processor to update firmware components on the basis of the data from the at least one update packet of the compiled first data storage medium under the control of the auxiliary operating system.

15. The memory apparatus according to claim 14, wherein compilation of data to form a bootable first data storage medium comprises creation of an image of a virtual storage medium.

16. The computer system according to claim 15, wherein execution of the program code by the service processor results in emulation of a standard interface to access the bootable first data storage medium.

17. The method in accordance with claim 3, wherein the main operating system is Microsoft® Windows®, and the auxiliary operating system is a customized version of the Linux operating system.

18. The method in accordance with claim 3, wherein in the step of booting, the service processor emulates, for the BIOS, a boot apparatus connected by a USB connection which is used to start the computer system from the second memory chip.

19. The computer system according to claim 9, further comprising:
a PCIe interface for providing a communication interface between the service processor and the main processor, wherein the PCIe interface is configured to interchange data between the flash memory device connected to the service processor via the dedicated connection and programs running on the main processor.

20. The computer system according to claim 19, wherein the service processor is configured to emulate, for the BIOS, a boot apparatus connected by a USB connection via the PCIe interface for booting the computer system from the compiled first data storage medium stored on the flash memory device.

* * * * *